Figure 1:
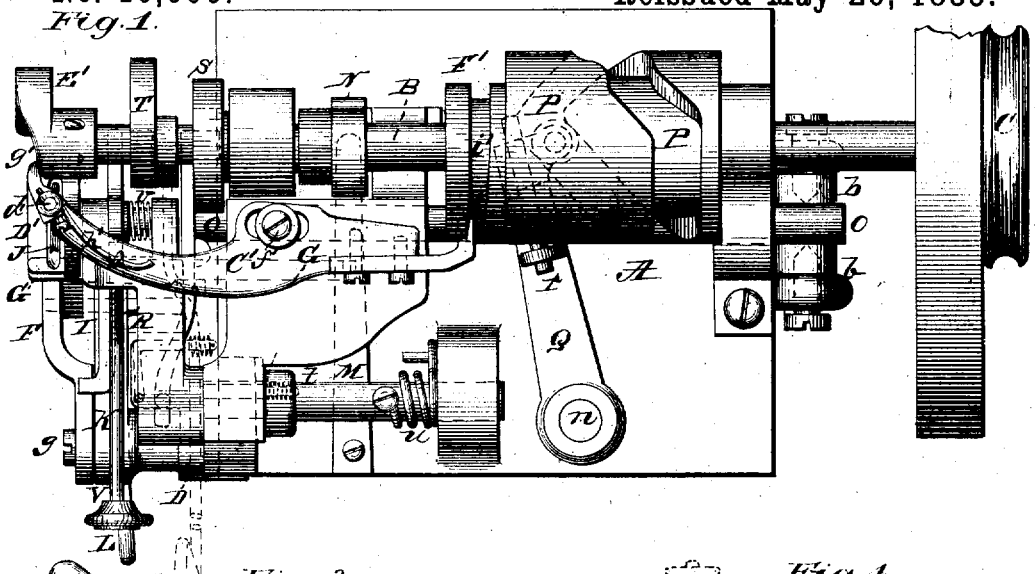

2 Sheets—Sheet 1.

M. P. C. HOOPER, née M. P. CARPENTER.

Assignor, by mesne assignments, to THE CARPENTER STRAW SEWING MACHINE COMPANY.

MACHINE FOR SEWING STRAW BRAID.

No. 10,600. Reissued May 26, 1885.

Witnesses:
[illegible]
F. E. Warner

Inventor.
Mary P. Carpenter Hooper

2 Sheets—Sheet 2.

M. P. C. HOOPER, née M. P. CARPENTER.

Assignor, by mesne assignments, to THE CARPENTER STRAW SEWING MACHINE COMPANY.

MACHINE FOR SEWING STRAW BRAID.

No. 10,600. Reissued May 26, 1885.

Witnesses:
Edw. H. Brooks
J. E. Warner

Inventor:
Mary P. Carpenter Hooper

UNITED STATES PATENT OFFICE.

MARY P. C. HOOPER, NÉE MARY P. CARPENTER, OF NEW YORK, N. Y., ASSIGNOR, BY MESNE ASSIGNMENTS, TO THE CARPENTER STRAW SEWING MACHINE COMPANY.

MACHINE FOR SEWING STRAW BRAID.

SPECIFICATION forming part of Reissued Letters Patent No. 10,600, dated May 26, 1885.

Original No. 171,774, dated January 4, 1876. Application for reissue filed January 30, 1885.

*To all whom it may concern:*

Be it known that I, MARY P. C. HOOPER, born Mary P. Carpenter, of the city, county, and State of New York, have invented certain new and useful Improvements in Machines for Sewing Straw Braid; and I do hereby declare that the following is a full, clear, and exact description of the same, reference being had to the accompanying drawings, which form part of this specification.

This invention more especially relates to that class of sewing-machines for sewing straw braid in which an eye-pointed needle of curvilinear or circular form and having a curvilinear-reciprocating motion is used, said needle operating in connection with other devices, including a hook for catching the loop, to produce a single-thread chain-stitch.

The invention consists in the combination, with an eye-pointed circular needle and a work-feeder, of the loop catching and spreading hook and operating mechanism, as described, whereby the distinct motions are imparted to said hook—namely, an oscillating motion on its own axis, a vibratory motion in a transverse relation with the feed, and a reciprocating motion in direction of the feed.

The invention further consists in an oscillating feeder, which is combined with an oscillating needle having its shank or carrier arranged to pass through the feeder and to work or oscillate between the center of motion of the feeder and its feeding-surface.

The invention further consists in a work-table and presser-foot supporter or carrier, combined with the main frame, carrying a feeder and sewing mechanism, said supporter or carrier being hung at its rear end to the rear portion of the main frame, whereby the work supporting and holding devices and the work itself may together be thrown up or back without interfering with or disturbing the sewing and feeding devices.

The invention further consists in the combination of a shaft or carrier carrying an oscillating piercing-needle, and constructed with a screw, with a cam and shaft arranged parallel with the said shaft or carrier, and a lever working as a nut on said screw, whereby the proper oscillating motion is given to said needle.

The invention further consists in the combination of a presser-foot, a lever carrying the presser-foot, a roller-guide, and a lip.

Figure 3:
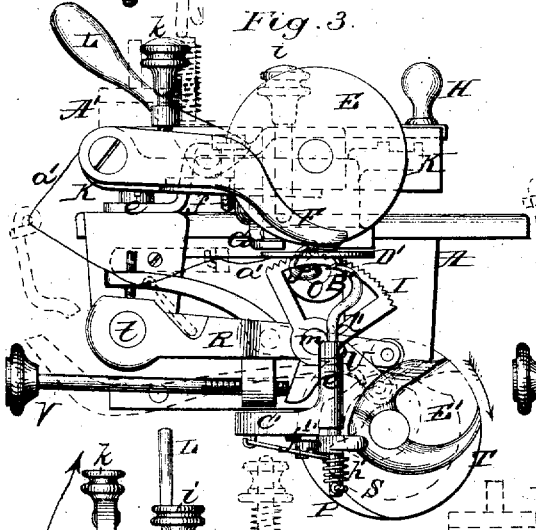
Figure 4:
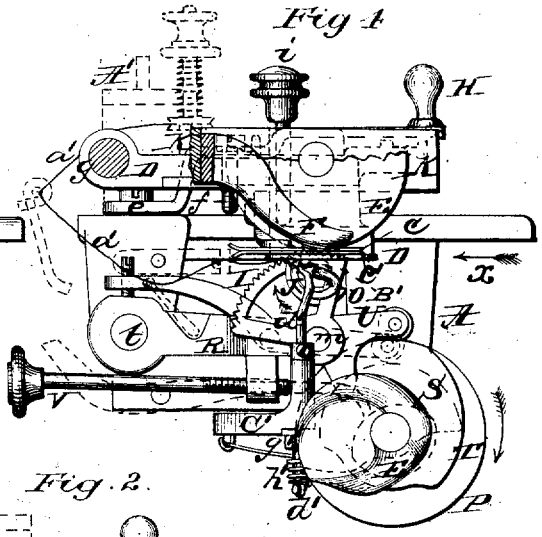
Figure 2:
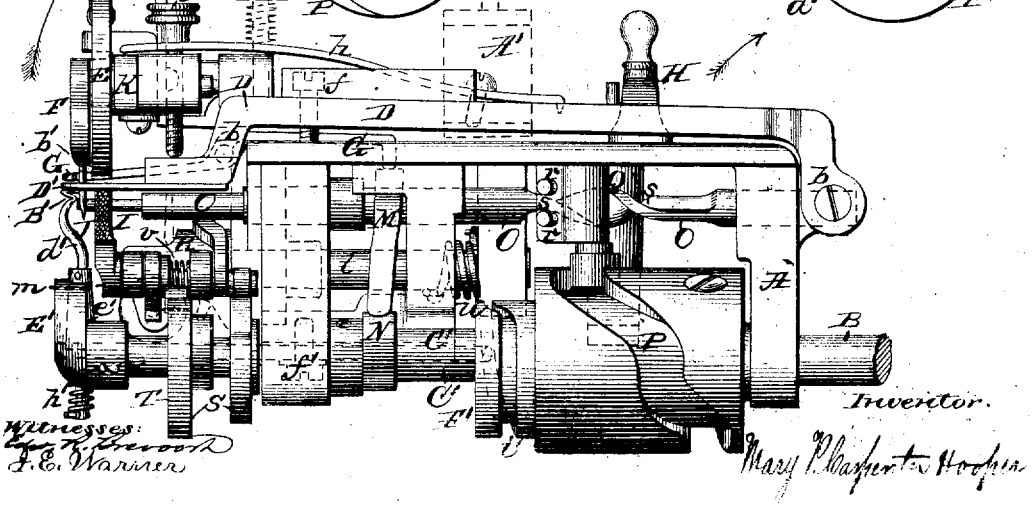
Figure 5:
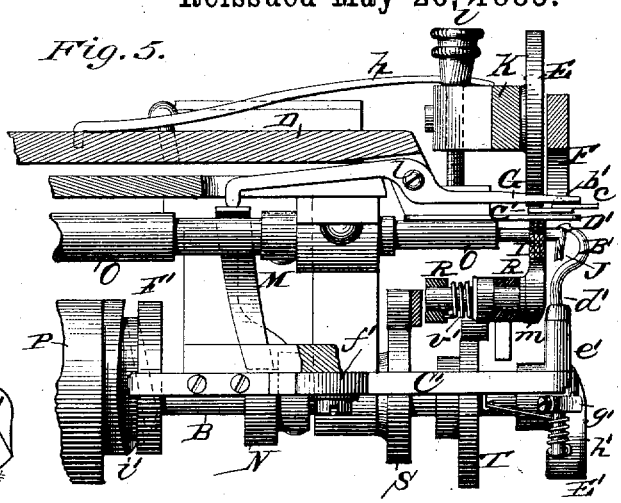
Figure 9:
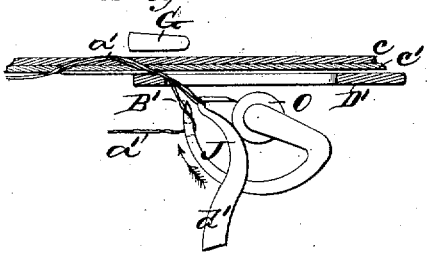
Figure 10:
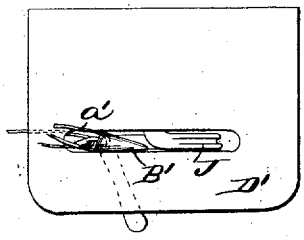
Figure 11:
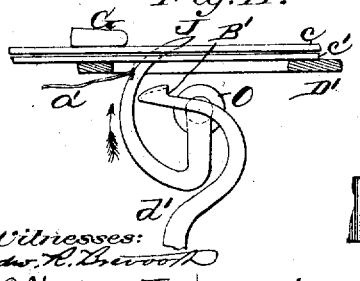
Figure 14:
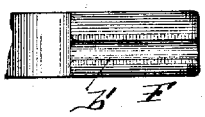

Figure 1 represents an inverted plan of a sewing-machine constructed in accordance with the invention; Fig. 2, a side view of the same; Figs. 3 and 4, front elevations thereof, with the parts in different working positions. Fig. 5 is a vertical section, in part, in transverse relation with the feed, and Fig. 6 a partial front view of like devices in like relative positions. Figs. 7, 8, 9, and 10 are front views and plans, respectively, upon a larger scale, of the needle and hook in different positions in relation to each other; Fig. 11, a further front view of like devices in a still different position, and Figs. 12 and 13 plan views or diagrams of the needle and hook in different positions. Fig. 14 is an under view of the forward portion of the presser-foot.

A is the base portion or main frame of the machine, and B the revolving main or driving shaft, receiving its motion from a pulley, C, or otherwise.

Figure 6:
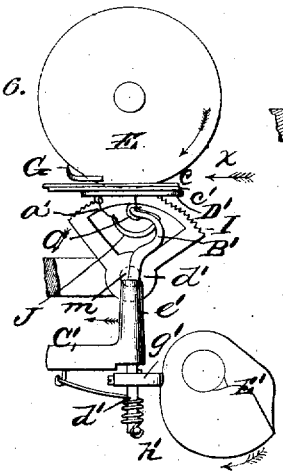

D is the work-table and presser-foot carrier or supporter, which is hinged at its back *b* to the main frame, and passes over the top of the latter and down in front of it, forming a work-table, D′, over and across which, in the direction indicated by the arrow *x* in Figs. 4 and 6, the braid or strips of braid *c c′*, lapping one over the other, are fed, said table being provided with any suitable adjustable back guide for the back or inner strip of braid, *c′*, while the other or front strip travels in front of and is guided by a free wheel or roller, E. About these guiding devices, however, nothing is here claimed as new irrespectively of the parts they are combined with. The back strip of braid is introduced under a front lip, and from thence under a presser-foot, F, to and under a rising and falling back clamp, G.

H is a swinging clamp or lever, pivoted at *e*, for holding down the work-table and presser-foot carrier D to its place, subject to adjustment by a screw, *f*, in an up or down direction or relatively to the feeder I and needle J. The front lip, under which the braid is introduced, the guide-wheel or roller E, and the presser-foot F are all carried by a lever, K, pivoted at *g* to the work-table carrier D, which lever is held down to its place by a spring, *h*, subject to a general adjustment by a screw, *i*, and a special adjustment of the presser-foot by a screw, *k*.

L is a cam-lever by which the lever K with its attachments, including the presser-foot, are raised when it is desired to introduce or remove the goods to be stitched. The rising and falling clamp G is formed by a lever, pivoted at *l* to the work-table carrier D. This clamp serves to hold in a firm or positive manner, and independently of the presser-foot, the work down to its place from slipping or moving backward while the curved needle J is being passed through the goods in a reverse direction to the feed, but which clamp is released when the needle is out of the goods and the feed is being made. The clamp G is thus operated or made to rise and fall alternately by means of a spring-lifter, M, controlled by a cam, N, on the main shaft B or by any other suitable devices.

O is the needle-carrier, which is formed of an oscillating shaft arranged to extend backward parallel with the shaft B, but above it, and which projects sufficiently in front of the main frame A, by which it is carried, to provide for the attachment of the needle J in proper relation with the presser-foot F and in front of the oscillating feeder I. To thus arrange the needle in relation with the oscillating feeder, which works on a center at *m* and is of a curved or arc shape on its feeding surface, the needle-carrier O or needle-shank, which virtually forms an extension of said carrier, is arranged to work between the center of oscillation *m* of the feeder and the feeding surface or portion of the latter. To this end the arc-shaped feeding portion of the feeder is connected, either by an arm at its one end or by arms at its opposite ends, with the center boss or portion of the feeder, thus providing for the passage of the needle-carrier or needle-shank through the feeder.

The needle carrier or shaft O is primarily operated by means of a grooved cam, P, on the main shaft B, and which is constructed to give the requisite intermittent oscillating motions to the needle through a lever, Q, pivoted at *n*, and in roller-gear with said cam. This lever Q carries two pins or studs, *r r*, arranged to cross the shaft or carrier O on opposite sides of its axis, and to fit or gear with a quick-screw, *s*, on the shaft O, thus making the lever Q, as it is moved to and fro by the cam P, to act as a sliding nut on the screw *s*, and so oscillate the needle carrier or shaft O as required.

The oscillating feeder I, which is a four-motion one, is operated as follows:

R is a lever, pivoted at *t* to the main frame, A, and forming a bearing for the pivot *m* of the oscillating feeder I. The pivot or shaft *t* of this lever R is controlled by a spring, *u*, which operates in concert with a cam, S, on the main shaft to give the alternate necessary rise and fall to the feeder I to provide for the feeder I rising and taking hold of the goods when making the feed, and of its falling and being released from the goods at other periods. Another cam, T, on the main shaft B operates in alternate relation with a spring, *v*, on the pivot *m* of the feeder to actuate a bell-crank lever, U, fast to the feeder I, for the purpose of oscillating the feeder in the direction of the feed and back again in appropriate relation with the rise and fall of the feeder, to effect the feed as in other four-motion feeds.

V is an adjustable stop, against which the lever U works to regulate the length of feed.

The needle J is an eye-pointed one of curvilinear or circular form, and has a curvilinearly reciprocating or oscillating motion, as described, and works, as it passes with its thread *a'*, during each stroke, first up through the goods and then down through them and back again—that is, supposing the parts connected with the sewing mechanism to be arranged in relation with each other as described, and whereby only a short or small neat stitch is formed on the upper or exposed side of the goods for a comparatively long stitch on its under side, said parts, which are connected with the sewing mechanism, might, however, be reversed, and the fair line of stitching be on the reverse side of the goods.

The thread *a'* is taken from a spool, A', on the main frame, and from thence through suitable guides and one or more tension devices and take-ups to the needle, passing within the groove in the back of the latter and through the eye in the point of the curved needle. To provide for the proper passage of said needle with its thread through the portion of the goods held down by the presser-foot, the latter is constructed with a longitudinal groove, *b'*, in the under side of its face or forward bearing portion, within which groove the needle is free to move as it is oscillated from its center or pivot *m*.

B' is the hook which catches the loop, and in conjunction with the curved needle J and feeding devices does the necessary sewing. Prior to describing the action of this hook and the means by which it is operated it will here be observed that said hook, together with its operating devices, as also the feeder and needle and their operating devices, or, in other words, the sewing mechanism generally, are all carried by the main frame A, while the work-table D' and presser-foot F are carried by the hinged piece or supporter D, so that on releasing the latter by swinging back the lever-clamp H said supporter, with its attachments and with the work or braid still in its place, may all be swung or thrown back from the hinge *b* as a center of motion to facilitate adjustment or repair of the sewing mechanism, or of arranging the thread in case it should become snarled, or for any other purpose or purposes that may be necessary.

Figure 7:
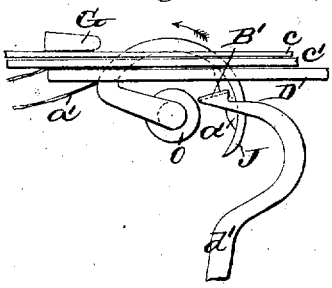
Figure 8:
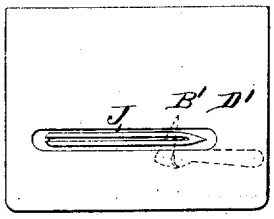
Figure 13:
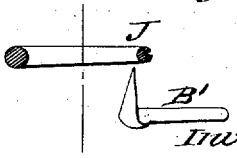
Figure 12:
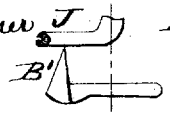

The action of the hook B′ is as follows: The hook, which occupies an upright position in front of the feeder I and needle J, has its shank *d′* arranged to oscillate in a socket, *e′*, of a horizontal lever, C′, having its fulcrum *f′* on the under side of the main frame, and which is not only free to rock on said fulcrum, but also by means of a slotted construction of said lever is capable of being moved longitudinally in direction of its length. Thus, referring more particularly to Figs. 7, 8, 9, 10, 11, 12, and 13 of the drawings, supposing the curved needle J to have completed its forward stroke through the goods, and to have commenced to retire or make its back-stroke, as shown in Figs. 7 and 8 of the drawings, leaving an exposed portion of the needle-thread for the hook to take hold of the hook B′ then, or rather shortly before the needle J commences its back-stroke, moves, together with its lever C′, horizontally backward, so as to enter between the needle-thread and needle, after which the needle makes its back-stroke out of the goods, and the hook B′ is turned by the cam E′ on or by its shank *d′*, and is moved by the vibration of its lever C′ in direction of the feed to spread or turn and adjust the loop into a suitable position for the next passage of the needle with its thread through it, as shown in Figs. 9 and 10 of the drawings. After this the hook B′ is turned by the cam E′ on or by its shank *d′* in a reverse direction, and moved horizontally outward by the forward longitudinal sliding of the lever C′, so as to carry it out of its loop, and adjust the hook in relation with the needle, as represented in Fig. 12. The lever C′ is then vibrated in a reverse direction to the feed, to bring the hook into its normal position after the needle has again passed through the goods, and before the hook is slid backward to enter again between the needle-thread and needle, as represented in Fig. 13 of the drawings. The feed of the goods of course takes place when the needle is out of the goods and when the hook B′ is traveling in direction of the feed. The means for accomplishing these several movements of the hook in relation with the needle may be varied; but the devices here shown consist of a cam, E′, on the forward end of the main shaft B, operating on a toe, *g′*, as against a spring, *h′*, to oscillate the hook, and an eccentric, F′, and cam-groove *i′* therein on said shaft B to vibrate and to give to the lever C′ its requisite longitudinal movements, the spring *h′* serving to keep both the toe *g′* in contact with the cam E′ and the lever C′ in contact with its grooved eccentric F.

I claim—

1. The combination, with the eye-pointed circular needle J and a work-feeder, of the loop catching and spreading hook B′, and operating mechanism, as described, whereby three distinct motions are imparted to said hook—namely, an oscillating motion on its own axis, a vibratory motion in a transverse relation with the feed, and a reciprocating motion in direction of the feed, substantially as specified.

2. The oscillating feeder I, in combination with the oscillating needle J, having the shank or carrier O, arranged to pass through the feeder, and to work or oscillate between the center of motion of the feeder and its feeding-surface, substantially as described.

3. The work-table and presser-foot supporter or carrier D, in combination with the main frame A, carrying the feeder and sewing mechanism, said supporter or carrier being hung at its rear end to the rear portion of the main frame A, whereby the work supporting and holding devices and the work itself may together be thrown up or back without interfering with or disturbing the sewing and feeding devices, substantially as specified.

4. The combination of the shaft or carrier O, carrying the oscillating piercing-needle J, and constructed with a screw, *s*, with the cam P and shaft B, arranged parallel with said shaft or carrier O, and the lever Q, working as a nut on said screw, whereby the proper oscillating motion is given to said needle, as set forth.

5. The combination of the presser-foot F, the lever K, carrying the presser-foot, the roller-guide E, and the lip, substantially as described.

In witness whereof I have hereto set my hand this 20th day of January, A. D. 1883.

MARY P. C. HOOPER.

Witnesses:
EDW. R. BREVOORT,
J. E. WARNER.